No. 853,122. PATENTED MAY 7, 1907.
A. L. SAXON.
AUTOMATIC TRUCK BRAKE APPLIANCE.
APPLICATION FILED JAN. 14, 1907.
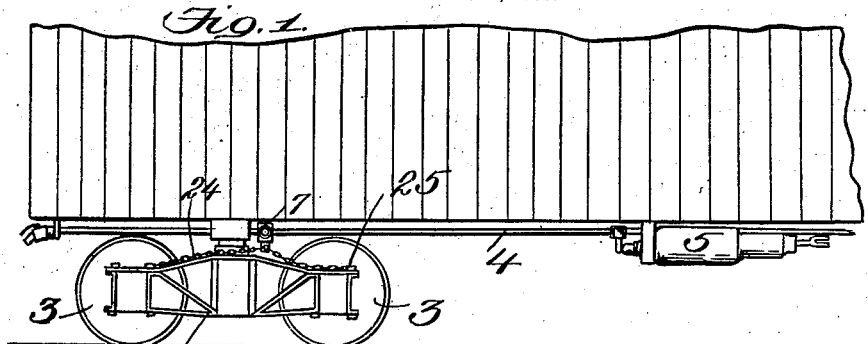
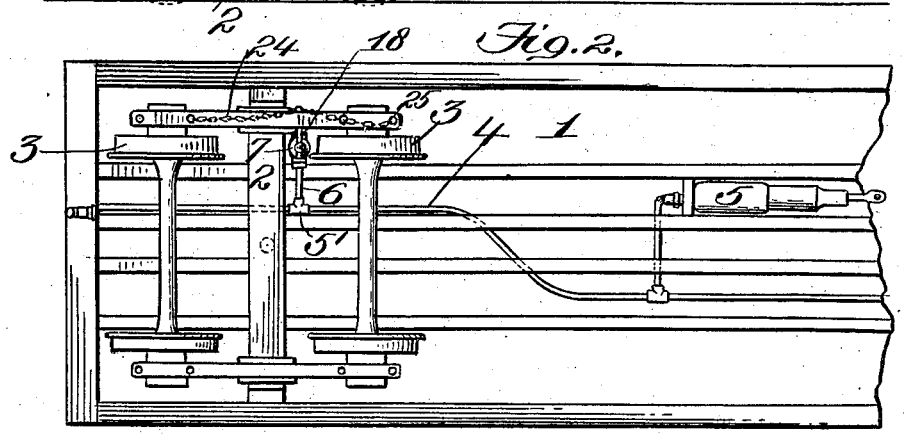
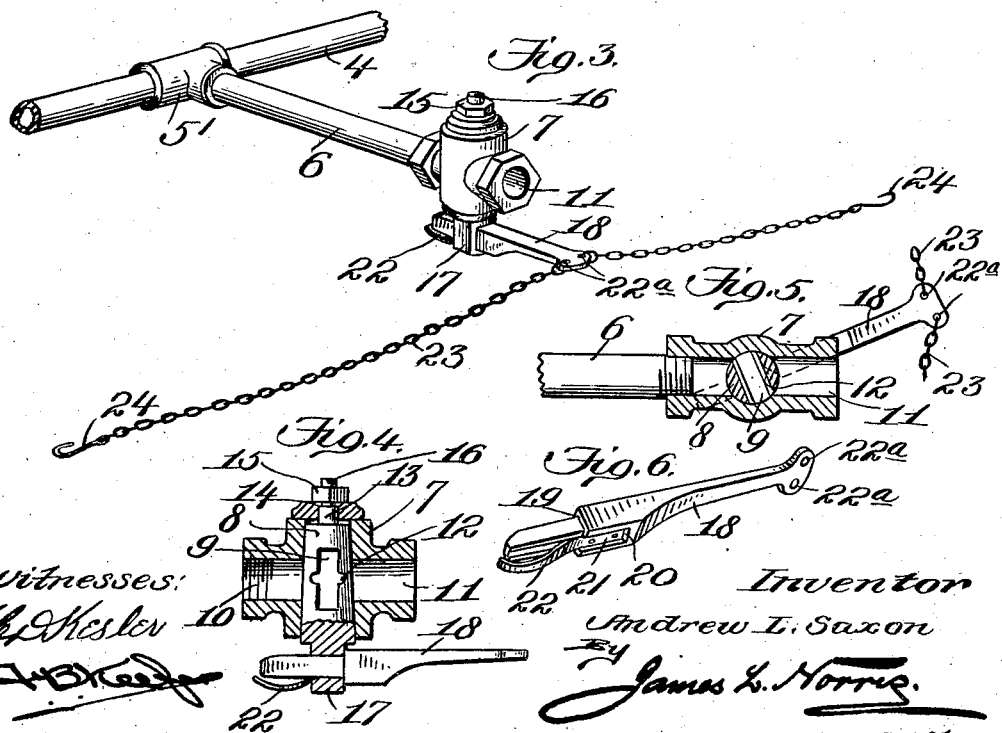
Inventor
Andrew L. Saxon

UNITED STATES PATENT OFFICE.

ANDREW L. SAXON, OF SOSO, MISSISSIPPI.

AUTOMATIC TRUCK BRAKE APPLIANCE.

No. 853,122.  Specification of Letters Patent.  Patented May 7, 1907.

Application filed January 14, 1907. Serial No. 352,296.

*To all whom it may concern:*

Be it known that I, ANDREW L. SAXON, a citizen of the United States, residing at Soso, in the county of Jones and State of Mississippi, have invented new and useful Improvements in Automatic Truck Brake Appliances, of which the following is a specification.

This invention relates to an automatic truck brake appliance for railway cars, and the object thereof is to provide, in a manner as hereinafter set forth, means associating with the truck of a railway car for causing the application of a fluid pressure brake when the truck or the running gear of the car assumes an abnormal position with reference to the car-body, as, for instance, when the truck is shifted to an angle with respect to the car body or when one or more wheels leave the rail.

A further object of the invention is to provide the appliance with means for causing a slight reduction of train pipe pressure so that the fluid pressure brake will be partially applied when occasion so requires, for example, in rounding a curve when it is desired to retard the speed of the car somewhat.

A further object of the invention is to provide the appliance with a valve mechanism which, when open, will reduce the pressure in the train pipe, thereby applying the brake, the valve so set up with respect to and connected with the truck in such a manner that, if the wheels should jump the track, it would cause an automatic disconnection between the operating mechanism and the valve, thereby leaving the valve wide open and causing the application of the brake.

A further object of the invention is to provide a railway truck brake appliance which shall be simple in its construction, strong, durable, automatic in its operation, efficient in its use, readily set up with respect to the fluid pressure brake mechanism of a car, and comparatively inexpensive.

With the foregoing and other objects in view, the invention consists in the novel construction, combination, and arrangements of parts hereinafter more specifically described and illustrated in the accompanying drawings, wherein is shown the preferred embodiment of the invention, but it is to be understood that changes, variations, and modifications can be resorted to which come within the scope of the claims hereunto appended.

In the accompanying drawings, wherein like reference characters denote corresponding parts throughout the several views, Figure 1 is a side elevation of a portion of a car showing the adaptation of the brake appliance with respect to the car truck. Fig. 2 is an inverted plan of the car showing the position of the brake appliance in accordance with this invention. Fig. 3 is a perspective view showing a portion of the train pipe, the valve mechanism for causing a reduction of train pipe pressure, and the operating means for the valve mechanism. Fig. 4 is a vertical sectional view of the valve mechanism. Fig. 5 is a sectional plan thereof. Fig. 6 is a sectional view of the operating means for the stem of the valve.

In the drawings the truck brake appliance is shown as applied to the forward truck of a car, yet it is evident that it can also be positioned in operative relation with respect to the rear truck, or the appliance can be set up in connection with both trucks.

Although the truck brake appliance is particularly adapted for railway cars for causing the application of a fluid pressure brake, yet it is to be understood that the appliance can be used upon any form of car for which it is found applicable.

Referring to the drawings by reference characters, 1 denotes the bottom of a car, 2 the car truck, 3 the wheels, 4 the train pipe, and 5 a brake cylinder. The foregoing may be of known construction.

Communicating with and connected to the train pipe 4 through the medium of a T-coupling 5' is a branch pipe 6 carrying on its outer end a valve casing 7 having the outlet thereof opening into the atmosphere. Within the valve casing 7 is arranged a plug valve 8 having a centrally arranged port or passage 9 for establishing communication between the inlet 10 and the outlet 11 of the valve casing, as well as for establishing communication between the train pipe 4 and the atmosphere. The vertical walls of the port or passage 9 are provided approximately centrally thereof with a groove 12 which is used for the purpose of obtaining a slight reduction of train pipe pressure to obtain the partial application of the brake when occasion so requires. The valve 9 at one end is formed with an extension 13 of less diameter than the body of the valve, and said extension passes through the top of the valve casing, an opening being provided for such purpose. The extension 13 is shouldered, as at 14, and which abuts against a shoulder formed in the wall of the opening through which the extension 13 passes, and, by such an arrangement, vertical movement of the valve 8 is prevented. A take-up nut 15 is provided upon the extension 13, the latter being screw-threaded, as at 16, to receive the nut 15. The other end of the valve 8 is formed with a stem 17 having a square opening through which extends a shifting arm 18 for the stem 17. The shifting arm 18 is shouldered, as at 19, and, when said arm 18 is in position, the shoulder 19 abuts against the stem 17. That portion of the arm 18 which projects from the shoulder 19 is of the same contour as the opening through the stem 17. One face of the arm 18 is recessed, as at 20, and, in the said recess is secured the end 21 of a curvilinear spring 22, the function of the spring 22 being to retain the arm 18 in the stem 17. The arm 18 is furthermore provided with a pair of openings 22ª in which are connected the flexible members 23. These members 23 extend in opposite directions with respect to each other and are provided with hooks 24 adapted to engage with the car truck, as at 25, for connecting the flexible members thereto.

From the foregoing construction it is evident that, if the truck shifts at an angle with respect to the car body, one of the flexible members will be drawn taut, causing thereby the actuation of the arm 18 and the shifting of the valve 8 so that the port or passage 9 will register with the inlet 10 and outlet 11 thereby opening the train pipe to the atmosphere, and, consequently, reducing the train pipe pressure and causing the application of the brake. If the truck shifts in an opposite direction, the other flexible member will become taut and actuate the arm 18 in an opposite direction which in turn will shift the valve 8 to closing position.

If the wheels of the car should jump the track carrying the truck therewith, such action would cause the opening of the valve and, furthermore, the disconnecting of the arm 18 from the valve stem, and, under such conditions, the valve would be left wide open, causing thereby the application of the brake.

Although the appliance is referred to as for use in connection with the trucks of cars, yet it is to be understood that the same is thoroughly applicable for the truck of a locomotive and that the trucks throughout a train from the locomotive truck to the rear truck of the last car can be provided with the appliance. It will furthermore be stated that, when the handle becomes detached from the valve stem owing to the derailment of the car or locomotive, or for other cause, the valve stem can be shifted by a suitable tool so as to close the valve, and, after the car or locomotive has been re-railed, the handle can then be attached to the valve stem.

What I claim is:

1. A truck brake appliance comprising the combination with a train pipe, of a valve mechanism communicating therewith and adapted to establish communication between the train pipe and the atmosphere, said valve mechanism provided with means for slightly reducing the train pipe pressure, and shiftable means detachably connected to said valve mechanism for opening and closing it.

2. A truck brake appliance comprising the combination with a train pipe, of a valve mechanism communicating therewith and adapted to establish communication between the train pipe and the atmosphere, said valve mechanism provided with means for slightly reducing the train pipe pressure, shiftable means detachably connected to said valve mechanism for opening and closing it, and a pair of flexible members connected to said means and with the truck of a railway car for actuating the means when the truck assumes an angle with respect to the bottom of the car.

3. A truck brake appliance comprising the combination with a train pipe, of a valve mechanism connected therewith and adapted when operated to establish communication between the train pipe and the atmosphere, shiftable means detachably connected with said mechanism for opening and closing it, and a pair of flexible members connected to said means and with the truck of a car and adapted to actuate the means when the truck assumes an angle with respect to the car body.

4. In a truck brake appliance, the combination with a train pipe and a car truck, of a valve mechanism connected with the train pipe, and connections between the valve mechanism and the car truck for opening said mechanism when the truck assumes an angle with respect to the car body, said connections provided with means for automatically detaching the same from the valve mechanism when the wheels of the truck are derailed thereby causing the valve mechanism to remain open.

5. A truck brake appliance comprising the combination with a train pipe and a car truck, of a branch pipe extending from the train pipe, a valve mechanism secured to the end of the branch pipe and embodying a valve provided with a stem having an opening, a shifting arm extending through the opening in the valve stem and detachably connected thereto, and a pair of flexible members connected to one end of said arm and to the truck for causing the actuation of said arm when the truck assumes an angle with respect to the body of the car.

6. A truck brake appliance comprising the combination with a train pipe and a car truck, of a branch pipe extending from the train pipe, and a valve mechanism secured to the end of the branch pipe and embodying a valve provided with a stem having an opening, said valve further provided with means for slightly reducing the train pipe pressure when the valve is partly shifted.

In testimony whereof I have hereunto set my hand in presence of two subscribing witnesses.

ANDREW L. SAXON.

Witnesses:
D. D. JEFCOAT,
BURO HILBUN.